M. STRINGER.
BRAKE MECHANISM FOR VEHICLES.
APPLICATION FILED JAN. 9, 1920.
1,348,331.
Patented Aug. 3, 1920.
4 SHEETS—SHEET 3.
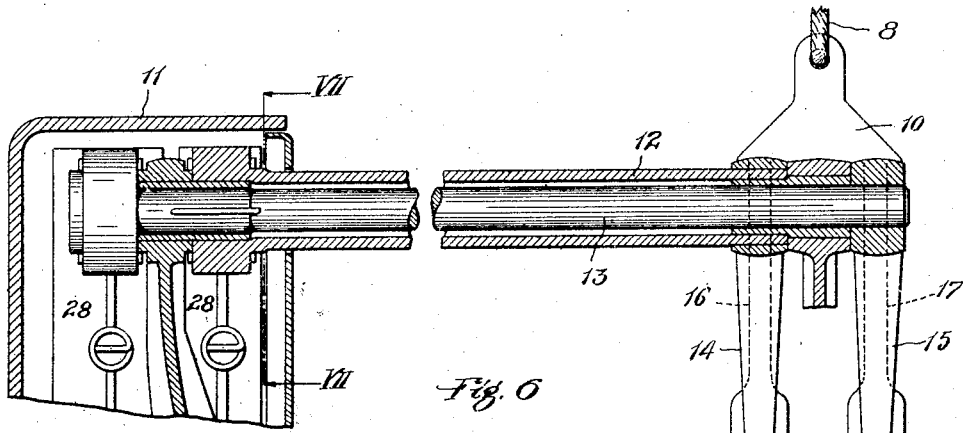
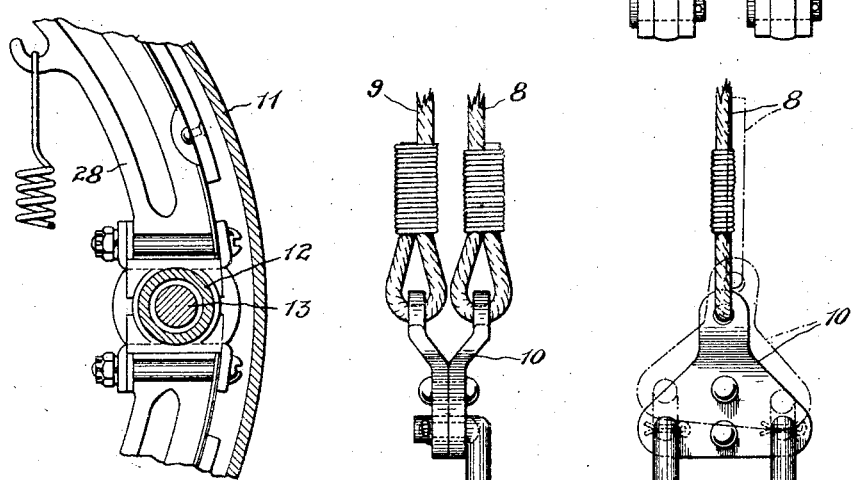
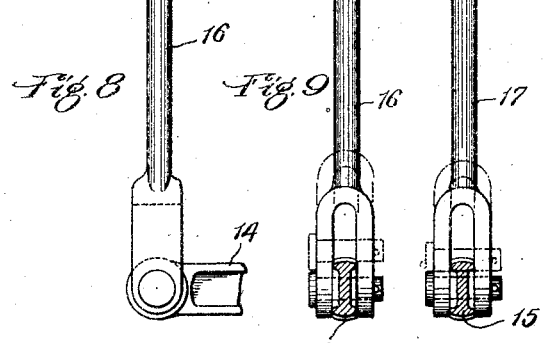

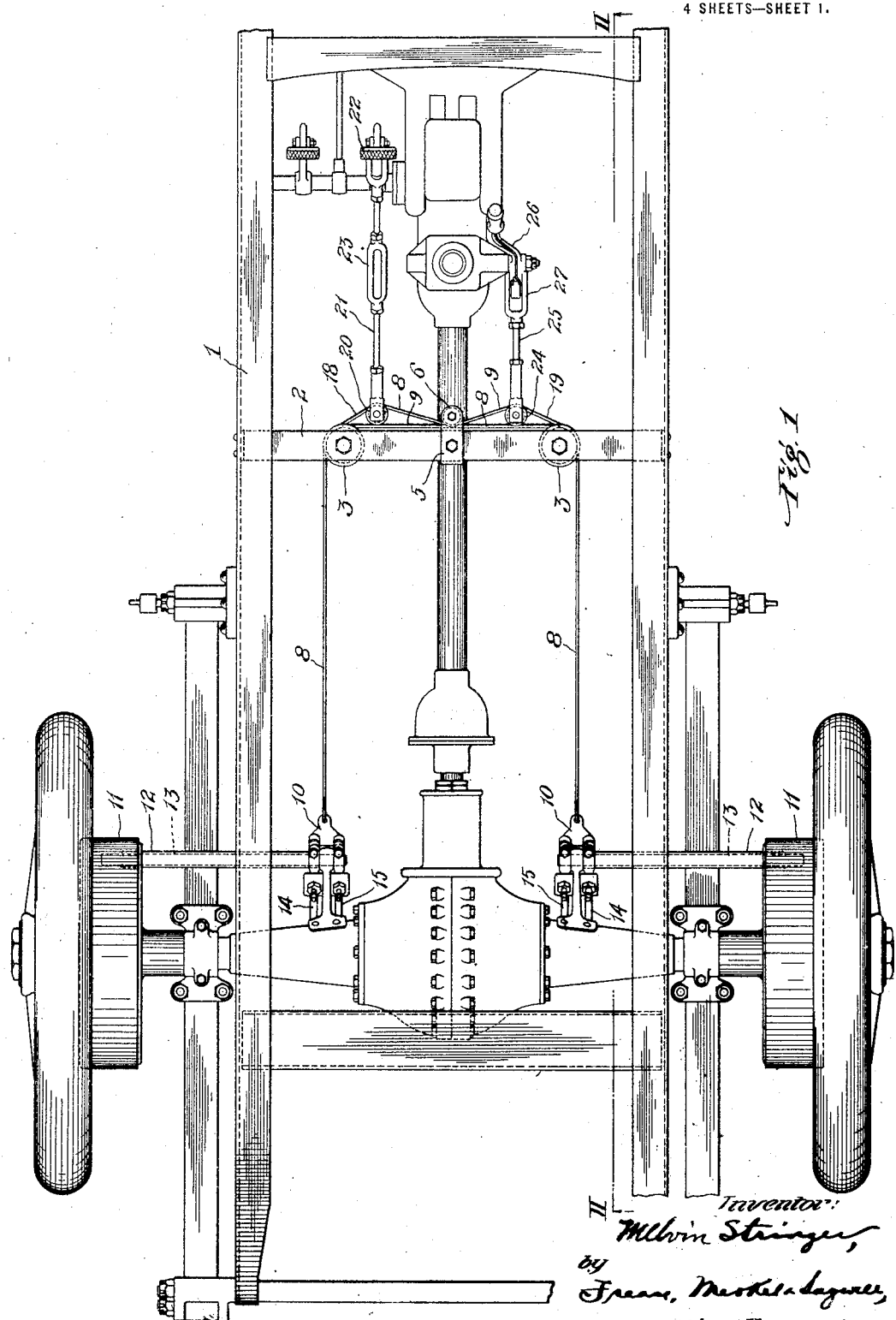

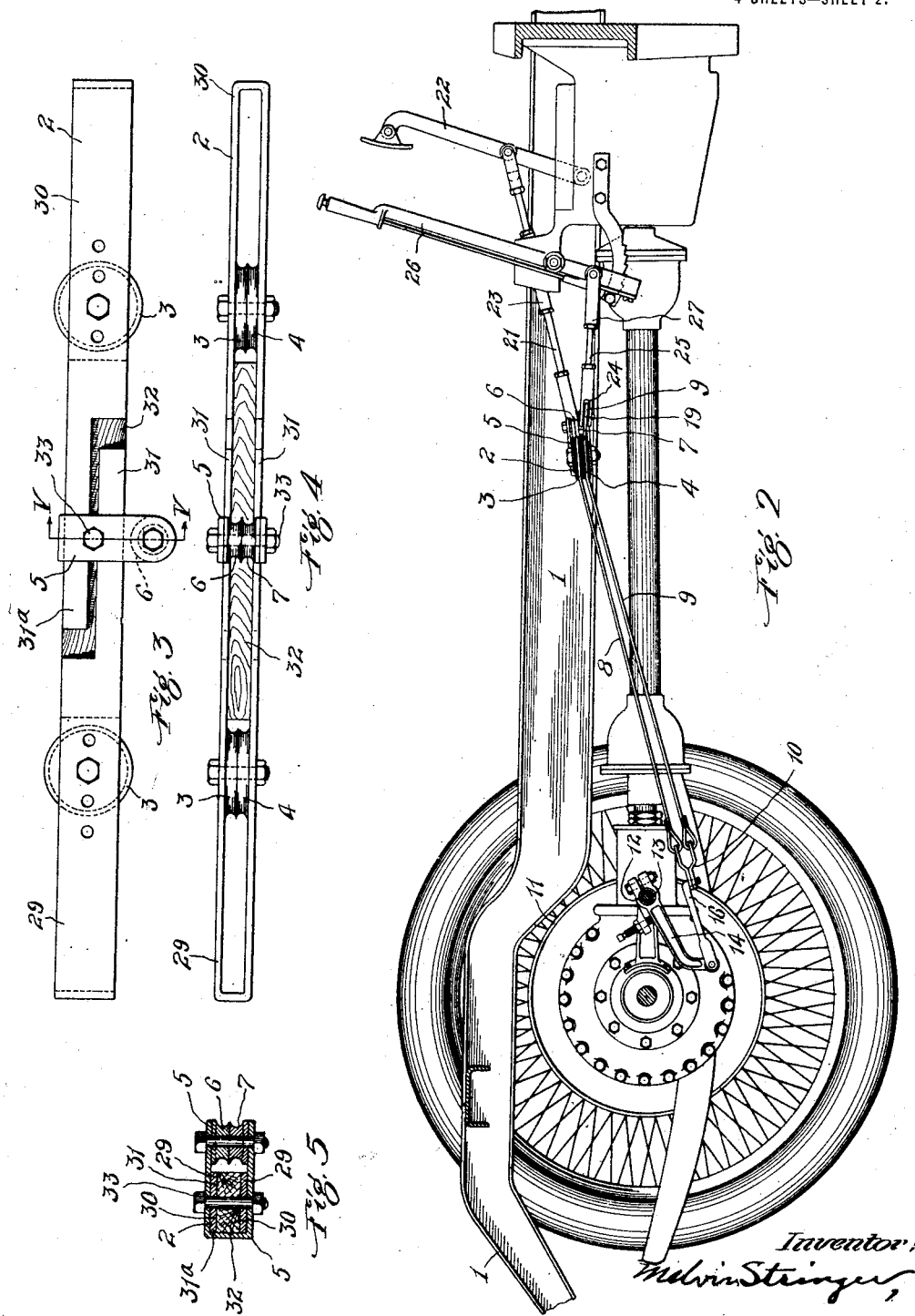

M. STRINGER.
BRAKE MECHANISM FOR VEHICLES.
APPLICATION FILED JAN. 9, 1920.

1,348,331.

Patented Aug. 3, 1920.
4 SHEETS—SHEET 4.

Inventor:
Melvin Stringer
by
His attorneys.

UNITED STATES PATENT OFFICE.

MELVIN STRINGER, OF CLEVELAND, OHIO, ASSIGNOR OF ONE-FOURTH TO GEORGE T. BAUDER AND ONE-FOURTH TO ARTHUR E. MERKEL, BOTH OF CLEVELAND, OHIO.

BRAKE MECHANISM FOR VEHICLES.

1,348,331.     Specification of Letters Patent.     Patented Aug. 3, 1920.

Application filed January 9, 1920. Serial No. 350,330.

*To all whom it may concern:*

Be it known that I, MELVIN STRINGER, a citizen of the United States, resident of Cleveland, county of Cuyahoga, and State of Ohio, have invented new and useful Improvements in Brake Mechanisms for Vehicles, of which the following is a specification, the principle of the invention being herein explained and the best mode in which I have contemplated applying that principle, so as to distinguish it from other inventions.

My invention relates to brake mechanisms for motor vehicles such as automobiles and the like, its object being to provide braking mechanism which will be simple in construction and efficient in its operation.

In the present construction of motor vehicles, the brake mechanism comprises ordinarily two brake drums respectively secured to the rear wheels of the vehicle. Coöperating with each of these drums are two brake bands. One of each of these pairs of brake bands is connected with the foot-operated brake-lever and the other of each of these bands is connected with the emergency brake lever. Two separate systems of braking mechanisms are thus provided which operate independently of each other, but which, owing to such independence, it is not practical to operate simultaneously. In some types of brake construction, one set of brake bands is located on the interior of the drum and the other on the exterior, so that one set of such bands is contractible and the other expansible. In the other type of construction, both sets of brake bands are located on the interior of the drums so that both sets are expansible. In both cases, the brake bands coöperate with the drums to effect the braking operation. Furthermore, whenever the braking action is brought into play, only two bands operate to effect the braking action, the other set of bands being inoperative at such time.

A specific object of my invention is to increase the braking action by providing a construction whereby both sets of brake bands may be operated simultaneously, thereby increasing the braking action for a given application of power, or decreasing the power necessary to be applied in order to produce a given braking action.

My invention also includes an arrangement whereby both sets of brake bands are operated simultaneously by either the foot operated lever or the emergency-brake lever. It is furthermore such that the operation of either will not interfere with the operation of the other.

The said invention consists of means hereinafter fully described and particularly set forth in the claims.

The annexed drawings and the following description set forth in detail certain means embodying my invention, the disclosed means, however, constituting but one of various forms in which the principle of the invention may be applied.

In said annexed drawings:

Figure 1 represents a plan of a fragmentary portion of the chassis of a motor vehicle embodying my invention.

Fig. 2 represents a side elevation of such portion of the chassis.

Fig. 3 represents a plan, on an enlarged scale, of a modified form of transverse frame-member.

Fig. 4 represents a front elevation of such transverse member.

Fig. 5 represents a section taken upon the plane indicated by line V—V in Fig. 3.

Fig. 6 represents a broken fragmentary horizontal section, on an enlarged scale, taken upon a plane passing through the axis of the cam-actuating rods connected with one of the brake-drums.

Fig. 7 represents a fragmentary section of one of the brake-drums taken upon the plane indicated by line VII—VII in Fig. 6.

Figs. 8 and 9 represent detail views of parts of the connections between the operating levers and the brake-members.

Figure 10:
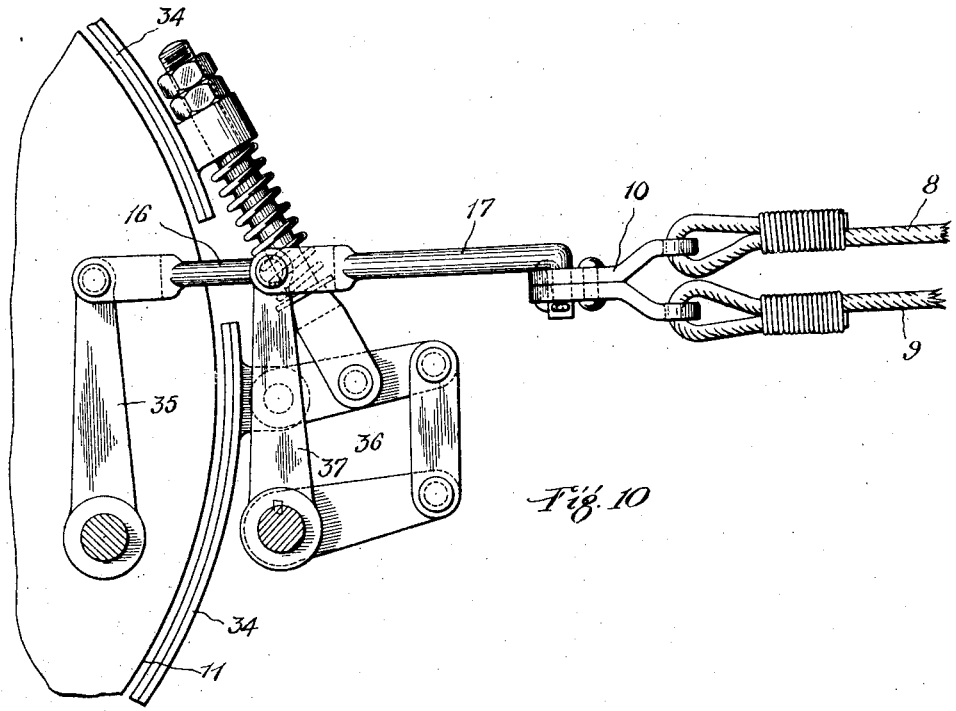
Fig. 10 represents a side elevation of a fragmentary portion of a second form of brake to which my invention may be applied.

In the illustrated embodiment of my invention, the frame 1 of the chassis is provided with a transverse member 2 upon which are mounted two sheaves, 3—3, these sheaves being spaced equally from the center line of the chassis, as shown in Fig. 1. Immediately below the sheaves 3—3 are mounted sheaves 4—4 also on the transverse member 2. Mounted upon an auxiliary member 5 suitably secured to the member 2 are two sheaves 6 and 7, as shown in Figs.

2 and 4. The sheaves 3—3 and 6 are mounted in the same plane, and the sheaves 4—4 and 7 are mounted in the same plane which is parallel with the previously mentioned plane. Two flexible cables 8 and 9 are provided which extend rearwardly and have their ends respectively connected with plates 10—10 which act somewhat as eveners, Fig. 1. These cables may of course be replaced by any inextensible but collapsible and flexible means. The brake-drums 11—11 are of the usual construction, and contain two interior brake bands 28, 28, which are caused to expand and coöperate with the drums to effect the braking action. The specific brake band and drum construction are of an accepted and well known type and constitute *per se* no part of my invention. The expansion of these brake-members is effected as usual by means of outside hollow rods 12—12 which actuate one of each of the pairs of brake bands, and interior rods 13—13, which operate the other members of each pair of brake bands, all as is well known and understood by those skilled in the art. The ends of these rods 12 and 13 are provided with the usual arms 14 and 15 respectively, Fig. 6, which are securely fixed thereto, but the outer or free ends of these arms are connected with the plates 10—10 as shown in Figs, 1, 8 and 9, by means of links 16 and 17.

The cable 8 runs over sheaves 3—3 and behind sheave 6, and cable 9 runs around sheaves 4—4 and behind sheave 7, and the said cables form bights 18 and 19 respectively, as shown in Fig. 1. The bight 18 is engaged by a pulley 20 mounted at the end of a connection 21 the front end of which is connected with the foot-operated brake-lever 22, as shown in Figs. 1 and 2. This connection is adjustable as to length by means of a turnbuckle 23. This effects adjustment of the brakes.

The bight 19 of the cable 9 is engaged by a pulley 24 mounted at the rear end of a connection 25 the front end of which is attached to the emergency brake-lever 26, as shown in Figs. 1 and 2. This rod 25 is also adjustable as to length by means of a turnbuckle 27.

The above described construction operates as follows:

When the foot-operated brake-lever 22 is actuated, it transmits its motion to the cable 8 and this motion is in turn transmitted to the plates 10—10 and through the latter to both pairs of actuating rods 12 and 13, and hence to both pairs of expansible braking-members 28—28 in the brake-drums 11. The connection between the cable 8 and the rod 21 being a running connection, as shown, this motion is equalized so as to distribute it properly to the two plates 10, 10, and these plates also act as equalizers and distribute the motion properly to the two rods 12 and 13 and thus to the braking members 28, 28. The latter are, therefore, brought into operation simultaneously. This actuation of the foot-operated brake-lever will, therefore, effect a braking action on the part of both pairs of braking members in coöperation with the brake drums.

When the emergency-brake lever 26 is actuated, its motion is transmitted through the rod 25 to the cable 9 and through the latter to the plates 10, 10, and as before to the expansible braking-members 28, 28. A braking action precisely the same as that previously described will therefore be effected by this actuation of the emergency-brake lever and the running connection between it and the cable and the action of the equalizing plates 10, 10, will also effect the transmission of such motion so as to distribute it to both sets of braking-members as required.

It will be further noted that should one set of brake bands on one side require a greater amount of movement to bring them into operation than is required for the other side, the equalizing action of the cables and the connections will cause that set which requires the least motion to first come into contact with the brake drum and before the maximum effect is produced thereby, the movement will be continued and transmitted to the other set. After both sets are in contact, further movement of the actuating braking lever will bring both sets into further contact, and thus effect a further and required braking action. Likewise, if either brake band of the same pair require a greater movement to bring it into contact with the brake drum than is required of the other, the plates 10 act as equalizers in the manner above described in connection with the equalizing action of the cable connections, as shown in dotted lines in Fig. 9.

In Figs. 3, 4 and 5, I have illustrated a modified form of transverse member 2. In this form, this member is made adjustable so as to fit various widths of frame. For this purpose, I make this member of two parts, the part 29 and the part 30, each consisting of a channel section and cut out at the inner ends so as to form overlapping extensions 31 and 31ª. A filler block 32 is interposed between the two overlapping portions of the members 29 and 30, and the latter are secured to each other by means of a bolt 33 which passes through the strap or member 5 which forms the support for the pulleys 6 and 7. It will, therefore, be seen that the member as a whole may be extended or contracted within certain specified limits determined by the dimensions of the members 29 and 30.

It will be noted that sheaves 3 are so arranged that the cables 8 and 9 extend directly back from the brake-operating mechanism in straight-away reaches substantially parallel with the axis of the machine. They then pass around the sheaves 3, 3, and each is provided with a bight into which its appropriate sheave or pulley 24 enters. My cables are made of material that is practically and in fact actually inelastic. It is found, however, that quicker response to the action of the braking levers is obtained when the straight-away reaches are used. The direct pull is, I think, partly accountable for this. The shorter length, that is shorter than the oblique reach, is also possibly partly accountable. If the cable reaches in an oblique direction there is apt to be a lag due possibly to inertia, and possibly to vibration, which occurs in spite of the inelastic quality of the cable, and other slight and obscure but positive defects arise.

Figure 11:
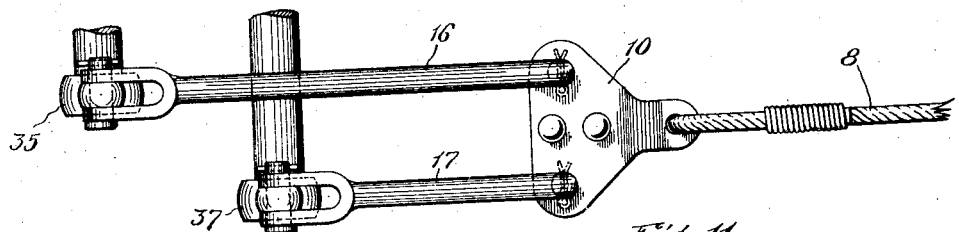
Figs. 11 and 12 represent plans of detailed parts of the connections used in the device illustrated in Fig. 10.

In Fig. 10, I have shown that type of brake drum in which an outer contractible brake band 34 is employed and an inner expansible brake band similar to the brake band 28, Fig. 6, employed upon the inside. This latter brake band is actuated by the usual lever 35 and the outer brake band 34 is actuated by the usual compound lever system 36 including an actuating arm 37. As thus far described, the construction is precisely that which is ordinarily used in this type of brake mechanism. Instead, however, of the arms 35 and 37 being connected through separate connections with the foot-lever and emergency-brake lever, as is usual, the upper ends of these arms respectively articulate with the links 16 and 17, Fig. 11, and these links engage the plate 10 which is connected with one end of the cables 8 and 9. The other brake member on the other side of the car is similarly connected.

Figure 12:
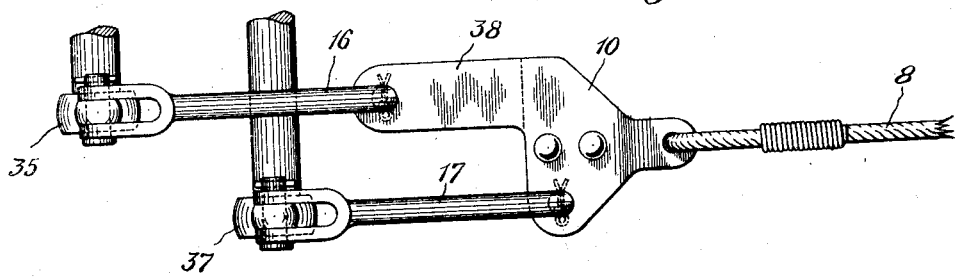

Movement of either lever therefore actuates both brake members of each part to clutch the corresponding drum simultaneously and with equal force.

Where it is desired to use links of the same length, the plate 10 may be modified in its construction as shown in Fig. 12 by providing an extension 38 to which the links 16 are attached. In this construction, these links become interchangeable, a condition which may at times be desirable and advantageous.

What I claim is:—

1. In a brake mechanism for motor vehicles, the combination of two brake drums; two pairs of braking members coöperating therewith, one pair to each drum; a foot-operated braking lever; a hand-operated emergency braking lever; two cables each having an end connected respectively with both members of each end of said pairs of braking members; and means connecting said levers and cables, each of said levers being adapted to actuate its associated cable and both pairs of braking members.

2. In a brake mechanism, the combination of two brake drums; two pairs of parallel acting braking members coöperating therewith one pair to each; two operating levers; two flexible cables each having its ends respectively connected with both members of each of said pairs of braking members; and adjustable means connecting said levers and cables a lever to a cable.

3. In a brake mechanism, the combination of two brake drums; two pairs of braking members coöperating therewith one pair to each drum; two operating levers; two cables each having an end respectively connected with both members of one of said pairs of braking members; and two adjustable rods each having one of its ends connected respectively with one of said levers and having a running connection with one of said cables respectively at its other end.

4. In a brake mechanism, in combination, a pair of drums, a pair of brake bands for each drum, a pair of cables connected at each end of each to one pair of both pairs of brake bands, and a separate lever connected to each cable, whereby either cable may be flexed to actuate all of said brake bands.

5. In a brake mechanism, in combination, a pair of drums, a pair of brake bands for each drum, the one band of each pair arranged inside of its particular drum and the other band of each pair arranged on the outside of the particular drum of its pair, a pair of cables connected at each end of each to one pair of both pairs of brake bands, and a separate lever connected to each cable, whereby either cable may be flexed to actuate all of said brake bands.

6. In a brake mechanism, in combination, braking drums and coöperating parallel acting braking means, said drums and means being arranged in pairs, a cable extending between the braking means of each pair, a lever for each said cable, an evening connecting device between each lever and its cable and means whereby a lever may actuate all the braking means.

7. In a braking mechanism, in combination, sets of braking drums and coöperating braking bands and levers, there being a pair of bands and levers to each drum and two drums and coöperating parts being arranged in each set, a flexible bighted cable extending at either end to the levers of a set, a lever for each of said cables, a pulley on the end of each lever, the bight passing around the pulley whereby pull on the lever puts equalized pressure upon the brakes of each set, and means whereby a lever may actuate all the braking means.

8. In a brake for motor cars, in combination, a pair of two-part brake mechanisms, links connected one to each member of each two-part brake mechanism, a plate for each mechanism, to which plate the links of each mechanism are connected, a pair of flexible cables, connected at each end to one of said plates, said cables extending back in straight reaches from said mechanism, a pair of pulleys past one of which each said cables is passed and a pair of levers connected one to each pulley whereby either pulley may be actuated to flex a cable and to put tension on the straight reaches to actuate both members of both brake mechanism.

Signed by me this 31st day of December, 1919.

MEL STRINGER.